US00RE42842E

(19) United States
(12) Reissued Patent
McPherson

(10) Patent Number: US RE42,842 E
(45) Date of Reissued Patent: Oct. 18, 2011

(54) BOW STRING VIBRATION SUPPRESSOR

(76) Inventor: Mathew A. McPherson, Norwalk, WI (US)

(21) Appl. No.: 11/874,833

(22) Filed: Oct. 18, 2007

Related U.S. Patent Documents

Reissue of:
(64) Patent No.: 6,966,314
Issued: Nov. 22, 2005
Appl. No.: 10/055,708
PCT Filed: Jan. 23, 2002

(51) Int. Cl.
*F41B 5/20* (2006.01)

(52) U.S. Cl. ..... 124/89; 124/25.6; 124/86

(58) Field of Classification Search ..... 124/23.1, 124/25.6, 86, 88, 89
See application file for complete search history.

(56) References Cited

U.S. PATENT DOCUMENTS

| | | | | | |
|---|---|---|---|---|---|
| 3,059,370 | A | * | 10/1962 | Moore | 43/19 |
| 3,658,157 | A | * | 4/1972 | Lee | 188/378 |
| 3,757,761 | A | | 9/1973 | Izuta | |
| 4,061,125 | A | * | 12/1977 | Trotter | 124/23.1 |
| 4,461,267 | A | * | 7/1984 | Simonds et al. | 124/25.6 |
| 4,628,892 | A | * | 12/1986 | Windedahl et al. | 124/25.6 |
| 5,323,756 | A | * | 6/1994 | Rabska | 124/86 |
| 5,452,704 | A | * | 9/1995 | Winebarger | 124/92 |
| 5,720,269 | A | * | 2/1998 | Saunders | 124/86 |
| 6,257,220 | B1 | * | 7/2001 | McPherson et al. | 124/89 |
| 6,681,755 | B2 | * | 1/2004 | Pujos | 124/89 |
| 6,966,314 | B2 | | 11/2005 | McPherson | |

FOREIGN PATENT DOCUMENTS

| | | | |
|---|---|---|---|
| WO | 01/59392 | * | 8/2001 |
| WO | 01/59392 | A1 | 8/2001 |
| WO | 01/59393 | * | 8/2001 |
| WO | 01/59393 | A1 | 8/2001 |

OTHER PUBLICATIONS

"Dealer-Only Jennings Line Gets New Damping System, Unique Camo", Arrowtrade, Jan. 2002 Edition, pp. 50-52.*
"Dealer-Only Jennings Line Gets New Damping System, Uniqur Camo", Arrowtrade, Jan. 2002 Edition, pp. 50-52.

* cited by examiner

*Primary Examiner* — John Ricci
(74) *Attorney, Agent, or Firm* — Vidas, Arrett & Steinkraus, P.A.

(57) ABSTRACT

A bowstring vibration and noise suppressor, the vibration and noise suppressor being carried by a support having an attachment device at an end of the support for attachment to a limb of an archery bow. The support carries the vibration and noise suppressor which is configured and arranged to suppress vibration and noise created by the bowstring when launching an arrow.

27 Claims, 4 Drawing Sheets

BOW STRING VIBRATION SUPPRESSOR

Matter enclosed in heavy brackets [ ] appears in the original patent but forms no part of this reissue specification; matter printed in italics indicates the additions made by reissue.

CROSS-REFERENCE TO RELATED APPLICATIONS

Not applicable.

STATEMENT REGARDING FEDERALLY SPONSORED RESEARCH

Not applicable

TECHNICAL FIELD

The subject invention relates to archery bows, and particularly to a device for damping the vibration and sound generated in the process of drawing and releasing the bow string.

BACKGROUND OF THE INVENTION

The bowstring on an archery bow is under a great deal of tension when the bow is in the braced condition. The bowstring carries at least a portion of the load required to bring the bow limbs to the brace position. In the case of the compound bow the bowstring carries the greatest portion of the load imposed between the bows limb tips in the brace condition with the secondary cables carrying the remainder. On recurve bows the bowstring is subjected to the entire load imposed between the bows limb tips. As such when the bowstring is displaced at or near its center and released it vibrates like a string on a musical instrument sending vibrations into the strings attachment points as well as creating noise by displacing the air around it.

A number of innovations have been directed at reducing the noise associated with these residual string vibrations associated with shooting a bow. In some cases attachments have been placed on the bowstring at various locations in an attempt to lessen or dampen these vibrations and the associated noise level. Some of these items with such names as Bear Puffs, Spider legs and String Leaches are well known to those in the sport as accessories that can be attached to the bowstring to reduce string noise.

Another means to reduce bow string vibration is disclosed in U.S. Pat. No. 4,061,125 titled "BOWSTRING POSITIONING DEVICE". The '125 patent shows an arm which extends rearwardly from the bow handle having a resilient member mounted on the extended end which engages the bowstring in the bows braced position. Along these same lines U.S. Pat. No. 4,461,267 titled "COMPOUND BOW" shows the use of two similar devices extending reward from the bow handle and intercepting the bowstring. While these devices were rather efficient at damping the bow strings vibrations that would otherwise been transmitted into the bow handle, the resiliency of the bumpers themselves did little to reduce the string noise and in most cases amplified rather than reduced the string noise. U.S. Pat. No. 5,720,269 titled "BOWSTRING SOUND DAMPENER" operates similar to the previously mentioned patents but provides a better means of arresting the bowstring so as to reduce string noise. All three patents '125, '267 and '269 are forms of string bumpers that engage the bowstring near the bowstrings center point in an area where the bowstring is traveling the fastest during arrow launch and all three string bumpers stop the forward progress of the bowstring at the brace position making separation of the arrow from the bowstring abrupt and premature. While the string bumpers of the '125 and '269 patents tend to reduce the shock and vibrations felt at the bow hand when shooting they did very little to reduce string noise and in most cases aggravated that problem. The initial impact point of the bowstring on these bow handle mounted bumpers tends to be laterally inconsistent and results in effecting shooting accuracy adversely.

BRIEF SUMMARY OF THE INVENTION

Applicants have solved the problem identified above with a bowstring vibration and noise suppressor. The vibration and noise suppressor is carried by a support having an attachment device at an end of the support for attachment to a limb of an archery bow. The support carries the vibration and noise suppressor which is configured and arranged to suppress vibration and noise created by the bowstring when launching an arrow.

The attachment device can be a U-shaped bracket designed to attach to the tip of a limb. The attachment device could also be a bracket shaped to attach to one side of the limb tip, either by gluing or with set screws. The vibration and noise suppressor can be an elastomer, such as a rubber or urethane and may also be solid or semi-solid, such as a gel material.

The support may be made of aluminum, plastic or a composite material, such as fiberglass, carbon composite or carbon laminate, or any other desired material.

BRIEF DESCRIPTION OF THE SEVERAL VIEWS OF THE DRAWING

A detailed description of the invention is hereafter described with specific reference being made to the drawings in which.

DETAILED DESCRIPTION OF THE INVENTION

Figure 1:
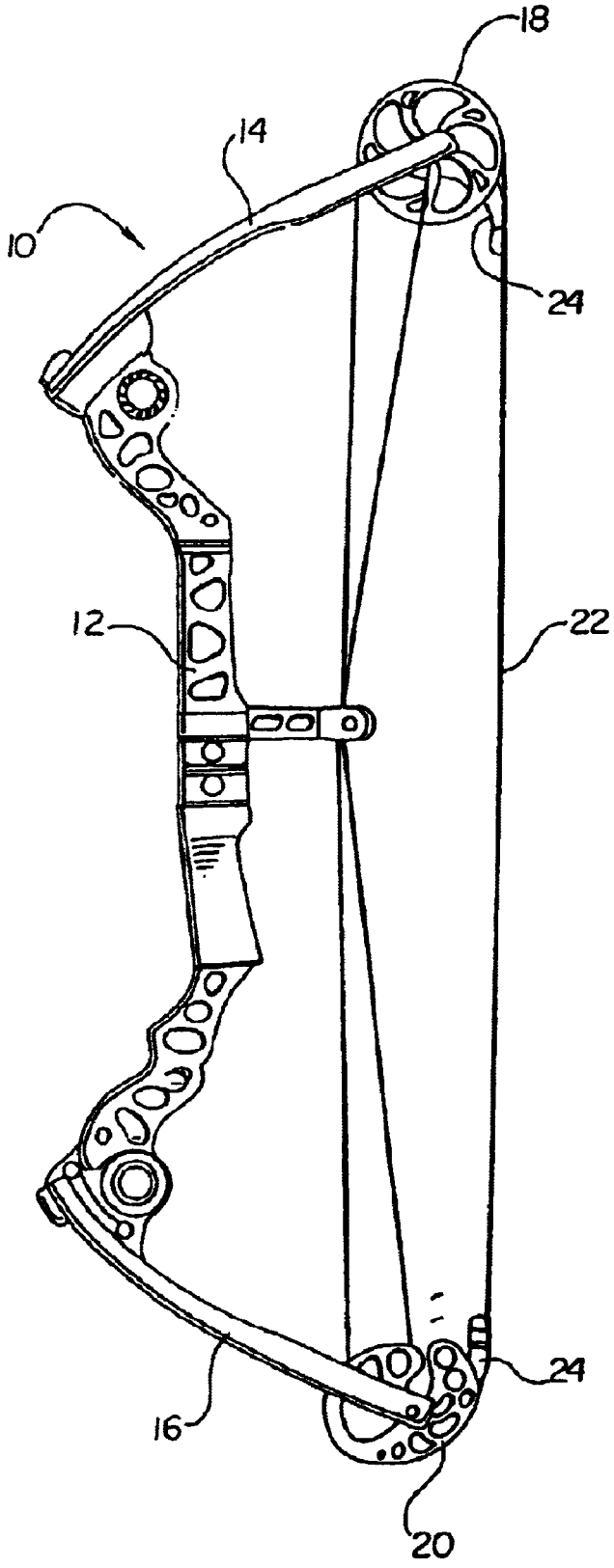
FIG. 1 is a side perspective view of an archery bow with the inventive noise and vibration suppressor.

While this invention may be embodied in many different forms, there are shown in the drawings and described in detail herein specific preferred embodiments of the invention. The present disclosure is an exemplification of the principles of the invention and is not intended to limit the invention to the particular embodiments illustrated.

Referring now to FIG. 1, an archery bow is shown generally at 10, which is comprised of a handle 12; first and second bow limbs 14 and 16; a pulley 18; a cam 20, and a bowstring 22, as is well known in the art. The inventive noise and vibration suppressors 24 are shown attached to the tip of each of the limbs 14 and 16.

Figure 2:
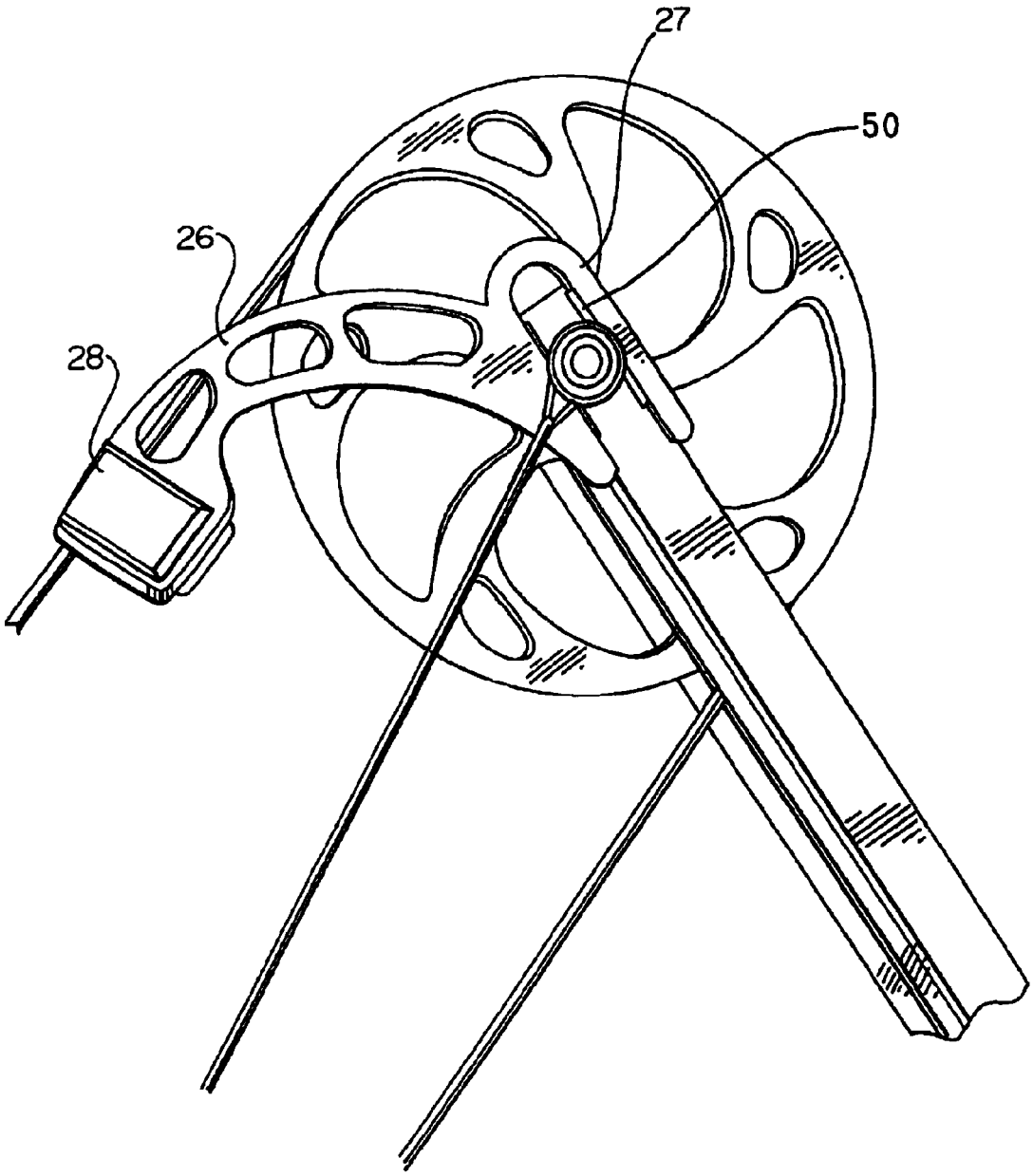
FIG. 2 is a side perspective view of the attachment bracket of the inventive noise and vibration suppressor.

As best seen in FIG. 2, the noise and vibration suppressor 24 is made of a curved support section 26 and a U-shaped bracket 27 which fits over the tip of a bow limb. The support 26 may be rigid or flexible, with the flexible support aiding in absorbing vibration. The noise and vibration suppressing material is shown at 28 and the support section 26 is configured to place the material 28 into contact with the bowstring when the bowstring is in the rest position.

The support section 26 and U-shaped bracket 27 are made of rigid aluminum in the embodiment shown in FIG. 2. However, it should be understood that the support section 26 and U-shaped bracket 27 could be made of any desired material, such as aluminum, plastic or a composite material, such as fiberglass, carbon composite or carbon laminate. The U-shaped bracket 27 is bolted through the limb to attach it to the limb (not shown). Bracket 27 could also be glued to the limb or attached with set screws. Although a U-shaped bracket is shown in FIG. 2, it should be understood that the attachment bracket could take the form of a section which is merely glued or screwed to a single side of the bow limb. A vibration absorbing material layer 50 (see FIG. 2) may also be inserted between the bracket 27 and the bow limb to prevent vibration from occurring between the bracket and bow limb.

The noise and vibration suppressing material 28 may be any elastomer, such as rubber or urethane, and may be either solid or semi-solid, such as a gel material. Applicant is currently using a formulation sold by RTP Company, 580 East Front Street Winona, Minn., 55987, U.S.A. called #2799 SX 96204, which is a styrenic thermoplastic elastomer having a 30 durometer (30 Shore A).

Figure 3:
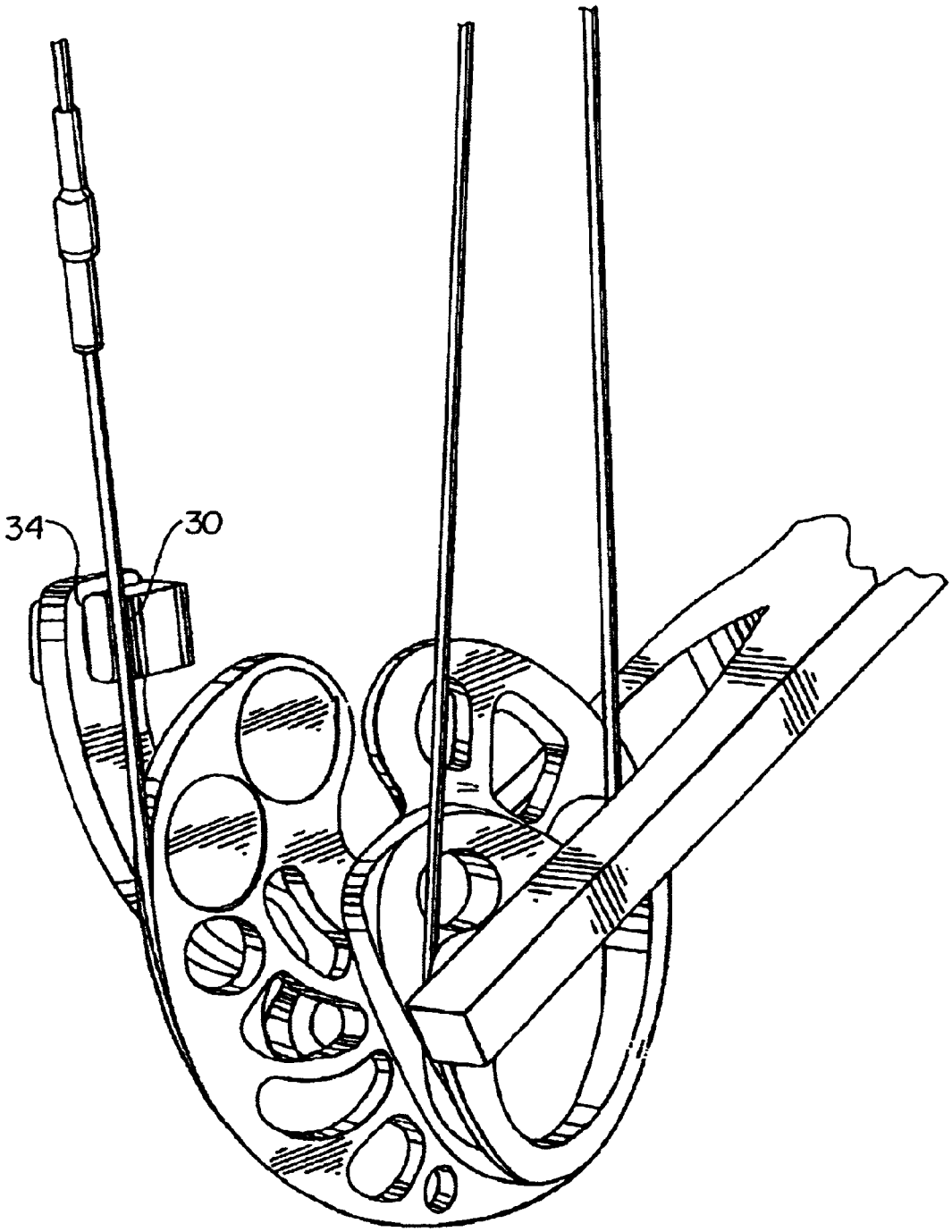
FIG. 3 is a perspective view of the groove of the noise and vibration suppressor material.

As best seen in FIG. 3, the material 28 is formed with a groove 30 which receives the bowstring 22. Also it can be seen in FIG. 3 that the material 28 is held in an opening 34 in support 26. The material 28 may either be mechanically retained in opening 34 or it may be attached using adhesives or other well known attachment methods. Support 26 also has cut-outs to reduce the weight of the support 26.

As seen in FIG. 1, the inventive noise and vibration suppressors may be used at both ends of the bowstring, or they may be used at a single end of the bow string. The inventive noise and vibration suppressors may be utilized on any type of archery bow, such as compound bows; crossbows, or recurve bows.

Figure 4:
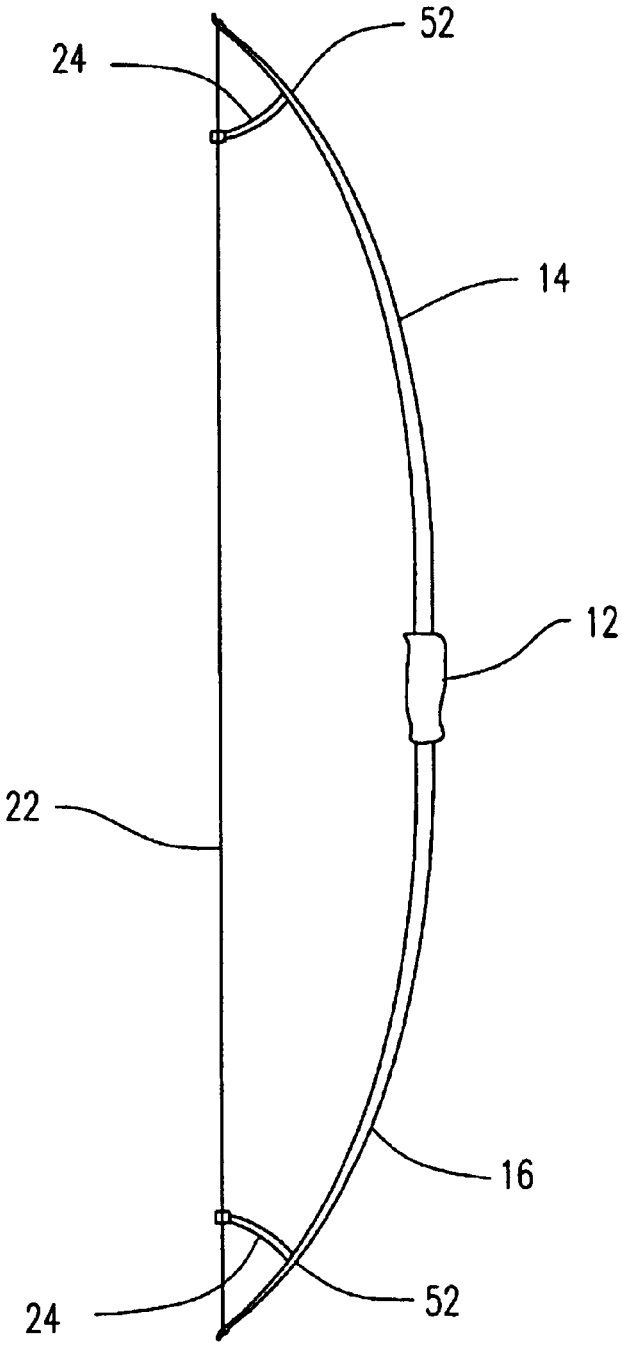
FIG. 4 shows a schematic of a bow.

FIG. 4 shows a bow schematic including a handle 12, a first bow limb 14, a second bow limb 16 and a bowstring 22. The bow schematic is representative of a bow which may be any type of bow disclosed herein, such as a compound bows a crossbow or a recurve bow. The bow may include a noise and vibration suppressor 24, which may be glued 52 to a bow limb 14, 16.

The above examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is:

1. A bowstring vibration and noise suppressor, comprising:

a vibration and noise suppressor support having an attachment device at an end of the support for attachment to an end of a limb of an archery bow *comprising a bowstring, the support comprising at least one cut-out to reduce weight*, the support carrying a vibration and noise suppressor which is configured and arranged to suppress vibration and noise created by the bowstring when launching an arrow, wherein the vibration and noise suppressor contacts the bowstring when the bowstring is in a rest position.

2. The bowstring vibration and noise suppressor of claim 1 wherein the support is made of aluminum.

3. The bowstring vibration and noise suppressor of claim 1 wherein the support is made of plastic.

4. The bowstring vibration and noise suppressor of claim 1 wherein the support is made of composite material.

5. The bowstring vibration and noise suppressor of claim 1 wherein the attachment device comprises a section of the support glued to the limb.

6. The bowstring vibration and noise suppressor of claim 1 wherein the vibration and noise suppressor is made of an elastomer.

7. The bowstring vibration and noise suppressor of claim 1 wherein the archery bow is a compound bow.

8. The bowstring vibration and noise suppressor of claim 1 wherein the archery bow is a crossbow.

9. The bowstring vibration and noise suppressor of claim 1 wherein the archery bow is a recurve bow.

10. The bowstring vibration and noise suppressor of claim 1 wherein the vibration and noise suppressor is a thermoplastic elastomer material.

11. The bowstring vibration and noise suppressor of claim 10 wherein the vibration and noise suppressor is a styrenic thermoplastic elastomer material.

12. The bowstring vibration and noise suppressor of claim 11 wherein the styrenic thermoplastic elastomer has a Shore "A" hardness of approximately 30.

13. A bowstring vibration and noise suppressor, comprising:

a vibration and noise suppressor support having an attachment device at an end of the support for attachment to a limb of an archery bow, the support carrying a vibration and noise suppressor which is configured and arranged to suppress vibration and noise [crested] *created* by the bowstring when launching an arrow, wherein the attachment device comprises a U-shaped bracket configured to attach to the tip of the limb of the archery bow.

14. The bowstring vibration and noise suppressor of claim 13, wherein the U-shaped bracket is attached to the limb *of the archery bow* by bolting the bracket through the limb *of the archery bow*.

15. The bowstring vibration and noise suppressor of claim 13, further including a shock absorbing layer which is placed between the U-shaped bracket and the limb *of the archery bow* to prevent vibration between the U-shaped bracket and the limb *of the archery bow*.

16. A bowstring vibration and noise suppressor, comprising:

a vibration and noise suppressor support having an attachment device at an end of the support for attachment to a limb of an archery bow, the support carrying a vibration and noise suppressor which is configured and arranged to *suppress* vibration and noise created by the bowstring when launching an arrow, wherein the vibration and noise suppressor is made of [an] a semi-solid gel material.

17. An archery bow comprising:

a handle;

first and second bow limbs attached to the handle *at inner ends*;

a bowstring attached to the archery bow;

a first vibration and noise suppressor support having an attachment device at an end of the support for attachment to an *outer* end of the first limb of the archery bow, the first support carrying a first vibration and noise suppressor which is configured and arranged to suppress vibration and noise created by the bowstring when launching an arrow, wherein *the first support extends past the outer end of the first limb toward the bowstring and* the first vibration and noise suppressor contacts the bowstring when the bowstring is in a rest position.

18. The archery bow of claim 17 further including a second vibration and noise suppressor support having an attachment device at an end of the support for attachment to the second limb of the archery bow, the second support carrying a second vibration and noise suppressor which is configured and arranged to suppress vibration and noise created by the bowstring when launching an arrow.

*19. A bowstring vibration and noise suppressor, comprising:*

*a vibration and noise suppressor support having an attachment device at an end of the support for attachment to an end of a limb of an archery bow comprising a bowstring, the support comprising at least one cut-out to reduce weight, the support carrying a vibration and noise suppressor which is arranged to suppress vibration and noise created by the bowstring when launching an arrow, wherein the vibration and noise suppressor contacts the bowstring as the bowstring vibrates when launching an arrow.*

*20. The bowstring vibration and noise suppressor of claim 19, wherein the suppressor comprises an elastomeric material.*

*21. The bowstring vibration and noise suppressor of claim 19, wherein the suppressor comprises a groove that receives the bowstring.*

*22. An archery bow comprising:*

*a handle;*

*a first limb attached to the handle, the first limb supporting an axle;*

*a second limb attached to the handle;*

*a bowstring attached to the archery bow;*

*a vibration and noise suppressor comprising a support and a suppressor, the support comprising an attachment device attached to said first limb, the attachment device spanning across said axle.*

*23. An archery bow having a first side and a second side, the archery bow comprising:*

*a handle;*

*first and second bow limbs attached to the handle at inner ends;*

*a bowstring attached to the archery bow;*

*a first vibration and noise suppressor comprising a support and a suppressor, the support attached to an outer end of the first limb of the archery bow and extending past the outer end toward the bowstring, the first vibration and noise suppressor arranged to suppress vibration and noise created by the bowstring when launching an arrow; and*

*a second vibration and noise suppressor comprising a support and a suppressor, the support attached to an outer end of the second limb of the archery bow, the second vibration and noise suppressor arranged to suppress vibration and noise created by the bowstring when launching an arrow.*

*24. The archery bow of claim 23, wherein the first vibration and noise suppressor is attached to the first side of the archery bow and the second vibration and noise suppressor is attached to the second side of the archery bow.*

*25. The bowstring vibration and noise suppressor of claim 23, wherein at least one vibration and noise suppressor comprises an elastomeric material.*

*26. The bowstring vibration and noise suppressor of claim 23, wherein at least one vibration and noise suppressor comprises a groove that receives the bowstring.*

*27. The bowstring vibration and noise suppressor of claim 23, wherein the first vibration and noise suppressor is attached to a side of the first limb.*

* * * * *

UNITED STATES PATENT AND TRADEMARK OFFICE

CERTIFICATE OF CORRECTION

PATENT NO. : RE42,842 E
APPLICATION NO. : 11/874833
DATED : October 18, 2011
INVENTOR(S) : McPherson It is certified that error appears in the above-identified patent and that said Letters Patent is hereby corrected as shown below:

On the Title Page:

Item [64], Replace sub-heading, PCT Filed: with sub-heading, Filed.

Signed and Sealed this
First Day of November, 2011

David J. Kappos

David J. Kappos
*Director of the United States Patent and Trademark Office*